Oct. 23, 1951

E. W. FLINT ET AL 2,572,804

AUTOMATIC ACCOUNTING DEVICE

Filed June 24, 1949

13 Sheets-Sheet 1

INVENTORS E. W. FLINT
A. E. JOEL, JR
BY John A. Hall
ATTORNEY

INVENTORS E.W. FLINT
A.E. JOEL, JR.
BY
ATTORNEY

Oct. 23, 1951 E. W. FLINT ET AL 2,572,804

AUTOMATIC ACCOUNTING DEVICE

Filed June 24, 1949 13 Sheets-Sheet 3

INVENTORS E.W. FLINT
A.E. JOEL, JR.
BY [signature]
ATTORNEY

AUTOMATIC ACCOUNTING DEVICE

Filed June 24, 1949

INVENTORS E.W. FLINT
A.E. JOEL, JR.
BY John A. Hall
ATTORNEY

INVENTORS E.W. FLINT
A.E. JOEL, JR.
BY [signature]
ATTORNEY

AUTOMATIC ACCOUNTING DEVICE

Filed June 24, 1949 13 Sheets-Sheet 6

INVENTORS E. W. FLINT
A. E. JOEL, JR.
BY John A. Hall
ATTORNEY

AUTOMATIC ACCOUNTING DEVICE

Filed June 24, 1949 13 Sheets-Sheet 7

INVENTORS E.W. FLINT A.E. JOEL, JR.

BY John A. Hall

ATTORNEY

Oct. 23, 1951 E. W. FLINT ET AL 2,572,804

AUTOMATIC ACCOUNTING DEVICE

Filed June 24, 1949 13 Sheets-Sheet 8

INVENTORS E.W. FLINT
A.E. JOEL, JR.
BY John A. Hall
ATTORNEY

AUTOMATIC ACCOUNTING DEVICE

Filed June 24, 1949

INVENTORS E.W. FLINT
A.E. JOEL, JR.
BY John A. Hall
ATTORNEY

INVENTORS E.W. FLINT
A.E. JOEL, JR.
BY [signature]
ATTORNEY

AUTOMATIC ACCOUNTING DEVICE

Filed June 24, 1949 13 Sheets-Sheet 11

INVENTORS E.W. FLINT
A.E. JOEL, JR.
BY John A. Hall
ATTORNEY

Oct. 23, 1951

E. W. FLINT ET AL 2,572,804

AUTOMATIC ACCOUNTING DEVICE

Filed June 24, 1949

13 Sheets-Sheet 12

INVENTORS E. W. FLINT
A. E. JOEL, JR.
BY John A. Hall
ATTORNEY

Oct. 23, 1951 E. W. FLINT ET AL 2,572,804

AUTOMATIC ACCOUNTING DEVICE

Filed June 24, 1949 13 Sheets-Sheet 13

INVENTORS E. W. FLINT
A. E. JOEL, JR.
BY John A. Hall
ATTORNEY

Patented Oct. 23, 1951

2,572,804

UNITED STATES PATENT OFFICE 2,572,804

AUTOMATIC ACCOUNTING DEVICE

Erlon W. Flint, Mountain View, N. J., and Amos E. Joel, Jr., New York, N. Y., assignors to Bell Telephone Laboratories, Incorporated, New York, N. Y., a corporation of New York Application June 24, 1949, Serial No. 101,085

5 Claims. (Cl. 235—61.7)

This invention relates to automatic accounting systems and particularly to systems wherein records automatically produced by and of customer uses of given facilities over variable time periods are processed by electrical devices in a number of steps to produce customer bills for the services rendered.

The object of the invention is to provide means for collecting the data from various and scattered sources in the records, to calculate the charges to be made and to translate the records into the form required for printing.

The present invention resides in a plurality of circuit details of one of the electrical devices employed for one step in the automatic accounting process, that device known as the computer. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assembles the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers and nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the calling line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observed call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given with a short explanation of certain features of the transformation.

(1) A message unit call entered as:

135246
131746
213046
005444 which is a call made from office 0 of the given marker group (identified in the tape identity entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marker group) the following output line:

125444

(2) A message unit call entered as:

135237
117537
214037
031234 which is a call from office 3 of the given marker group (identified in the tape identity entries) from calling line 1234 and extending from 17.5 minutes to 35.2 minutes. The billing index (4) we will assume will cause the calculation of 18.7 minutes of elapsed time to indicate 12 message units so that the computer will form and cause to be perforated on the number 3 perforator (sorted by office when the marker group contains more than one office) two output lines:

201234
000012

(3) A message unit call entered as:

101673
281021
156273
213073
005444 is one very similar to Example No. 1 except that it also includes an hour entry. The elapsed time is calculated as follows:

$$\begin{array}{r} +01.6 \\ +60.0 \\ -56.2 \\ \hline +5.4 \end{array}$$

If this in combination with the billing index indicates 3 message unit calls then the output will be:

135444

(4) A message unit call might appear as:

101652
281899
156252
213052
005444

The second line in this case is known as an irregular hour entry and while it does not show the actual hour it nevertheless sets the hour circuit back an hour so that the calculation is identical with Example No. 3 and the output line will be:

135444

(5) Should a call appear as follows:

101657
281021
281020
156257
213057
005444 then the calculation of elapsed time would be as follows:

$$\begin{array}{r} +01.6 \\ +120.0 \\ -56.2 \\ \hline +65.4 \end{array}$$

Assuming that this elapsed time will indicate 27 message units, the output becomes:

235444
000027

(6) If the line 5444 of Example No. 1 were under observation, then the input to the computer would be as follows:

135246
131746
243046
005444
051133
010000

The entry index (the B digit of the first line of the initial entry) is 4 instead of 1 as in the first example, and two supplementary lines giving details of the called number are added. In this case the computer forms and causes to be perforated on the number 5 perforator, as before, the output line:

125444

This is billing information and will eventually be the data from which the customer's bill is made up.

In addition the computer forms and causes to be perforated on the line observation tape the following:

105444
062511
051133
010000
000402

This is supervisory information and is not used in forming bills but goes to company officials for various purposes such as routine checking, or for answering complaints, etc. The second line is formed by a translator from an assumed date (15th), hour (21) and answer time (31). The third and fourth lines are copies of the last two lines of the assembled call and the last line has a record of the message unit index (0), the chargeable time (04—rounded off from 3.5) and the number of message units charged (02).

(7) In Example No. 6 if the third line had been 233046 instead of 243046 then a message unit detail call is indicated. In such case the output line will be 125444 as before and the five-line detail information record will be exactly the same except that it will be perforated on the MUD tape instead of the LO tape and will eventually go to the customer for his information.

(8) A detail call read from the incoming tape as:

135213
131713
239013
005444
051133
010000 will be processed and distributed to the detail call output tape as:

105444
062511
051133
010000
000400

The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

135213
131713
249013
005444
051133
010000 the following record:

105444
062511
051133
010000
000400 will be perforated in both the line observing output tape and the detail call tape.

There are many variations of the above described patterns to take care of many operating contingencies and which need not be described in detail. One of the important circuits of the computer but which in fact gets less use than others is the so-called straddle circuit for taking care of a variety of irregular calls and which are mainly recorded so that an operator or clerk may investigate the irregular circumstances and prepare a bill by hand.

In general, the computer consists of a plurality of registers into which both items of specific information and items of general information may be entered, a calculator, steering means, line forming pattern means and distributing means. Specific details of a call are entered, the elapsed time is calculated and this is weighted, rounded off and converted into charges, either chargeable time or a number of message units.

Again, generally the first items of information entered in the computer are the recorder number, the hour and the day and these are registered before any specific problem is presented for calculation and remain registered until a complete group (for a single call identity index) of calls has been processed. During the processing of this group the hour and the day registrations are changed from time to time by the occurrence of an hour entry found among the scattered items of specific information.

The first of the specific items of information to be registered are the two items fixing the start and end of the customer use of the facilities and from these the calculator derives the elapsed time and transmits this to an elapsed time register where it is held under control of an output control circuit. Generally the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer the output control will cause the selection of a particular output channel and will transmit thereto the patterned lines such as those explained hereinabove.

A feature of the invention is a means for delaying the registration of entry lines while awaiting the perforating or other disposition of information already registered to insure a full reading cycle when finally allowing registration. As above noted the computer is controlled by a train of pulses supplied by a cam arrangement on the reader which is operated by a constant speed motor. Specifically, a circuit is recurrently closed for about forty milliseconds and opened for about twenty milliseconds so that there are about sixteen cycles per second. The reading of a code starts at the beginning of a forty-millisecond closure of this circuit and must be satisfactorily completed within a given period thereafter so that a check for validity may be made and reported within another limited period thereafter to allow time before the ending of this forty-millisecond period for some other given operation, such, for instance, as the transfer of the code just read to a register. Means must be provided for holding the circuits from the reading relays open for various reasons and hence means are now provided so that if such circuits from the reading relays are not properly closed before the beginning of a cycle (a forty-millisecond closure followed by a twenty-millisecond opening of a circuit) then such circuits are maintained open during the entire forty-millisecond period. Thus, an operation is not allowed to start at some indefinite time after the beginning of a cycle so that a full period for a proper operation is insured.

A feature of the invention may, therefore, be stated as a gate means which may be locked in closed position and maintained in such position if it has not been opened prior to the attempted passage of a signal therethrough.

In a specific embodiment of the invention, the reader is provided with contacts by which a precisely timed train of impulses corresponding in time and duration to the reading intervals thereof and a circuit from these contacts is extended through the validity circuit of the reading relays and forms the basic circuit for operating the register connector relays whereby transmission paths between the reading relays and the various registers are established. Each register is provided with a down-check circuit whereby the condition of the register, whether occupied or completely released and ready for use is continuously reported. A register connector relay may only be operated when its down-check relay reports the said register to be released and ready for use. In accordance with the present invention, gate relays are provided and each has a locking circuit controlled by the down-check relay of the register which the gate relay controls so that the "gate" cannot be opened until the down-check relay reports the register to be in condition for use. The gate relay also has another locking control provided by a connection to the said validity circuit so that if it should happen that the down-check relay should report a register now ready for use, the gate cannot be opened during a reading interval, but must perforce be maintained closed until the end of the reading interval. By this means it is insured that when a gate is opened, the register now available for use shall have a full reading interval in which it may be operated.

The drawings consists of thirteen sheets having sixteen figures as follows:

Fig. 2 is a highly schematic showing of the basic switching circuit employed herein;

Fig. 3 is a block diagram showing how Figs. 4 to 13, inclusive, may be placed to form a more detailed but yet a schematic-like use of the elements of the present invention and in which:

Fig. 4 shows the reader and the reading relays by which the input tape is scanned;

Figure 5:
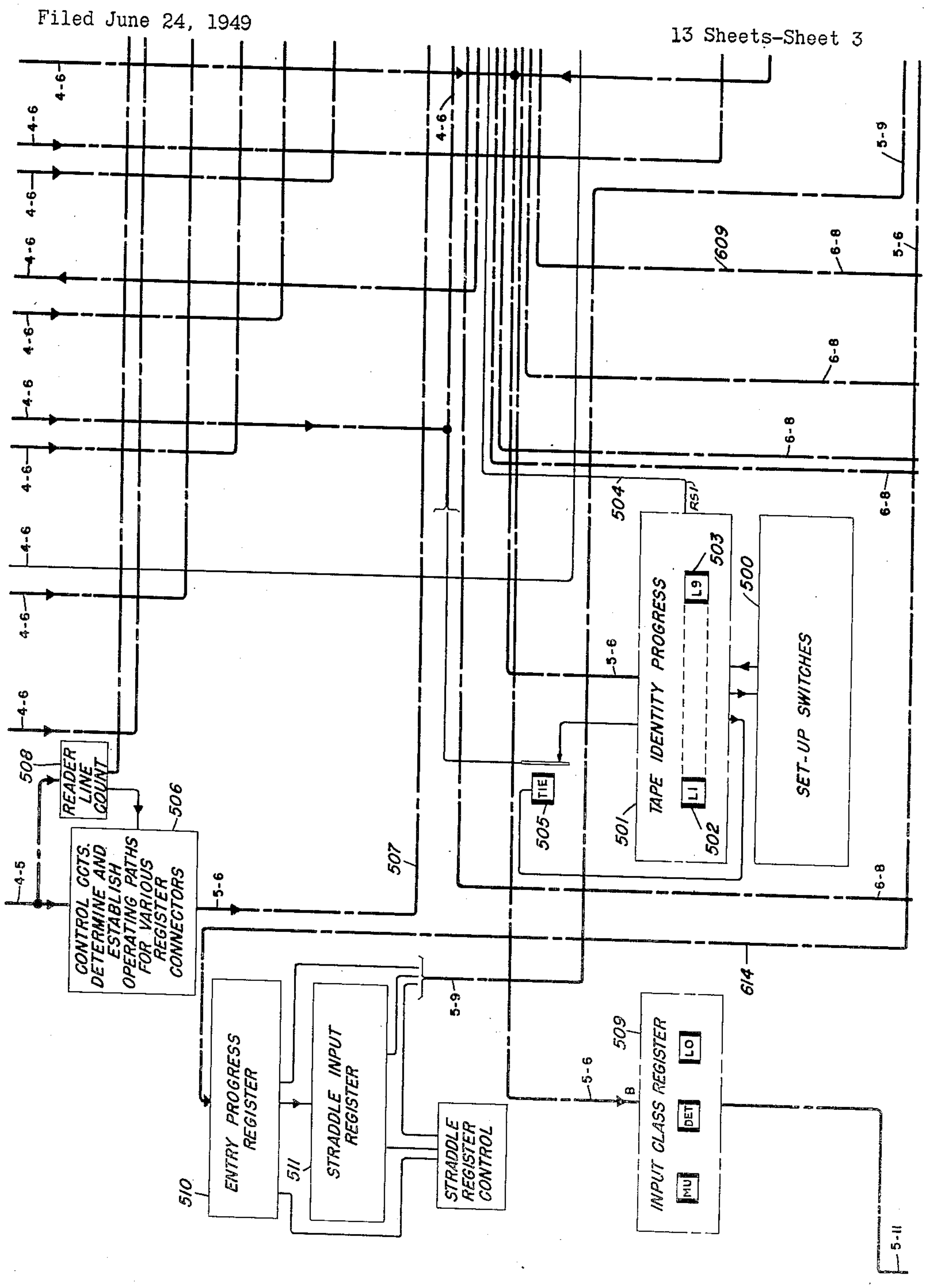
Figure 6:
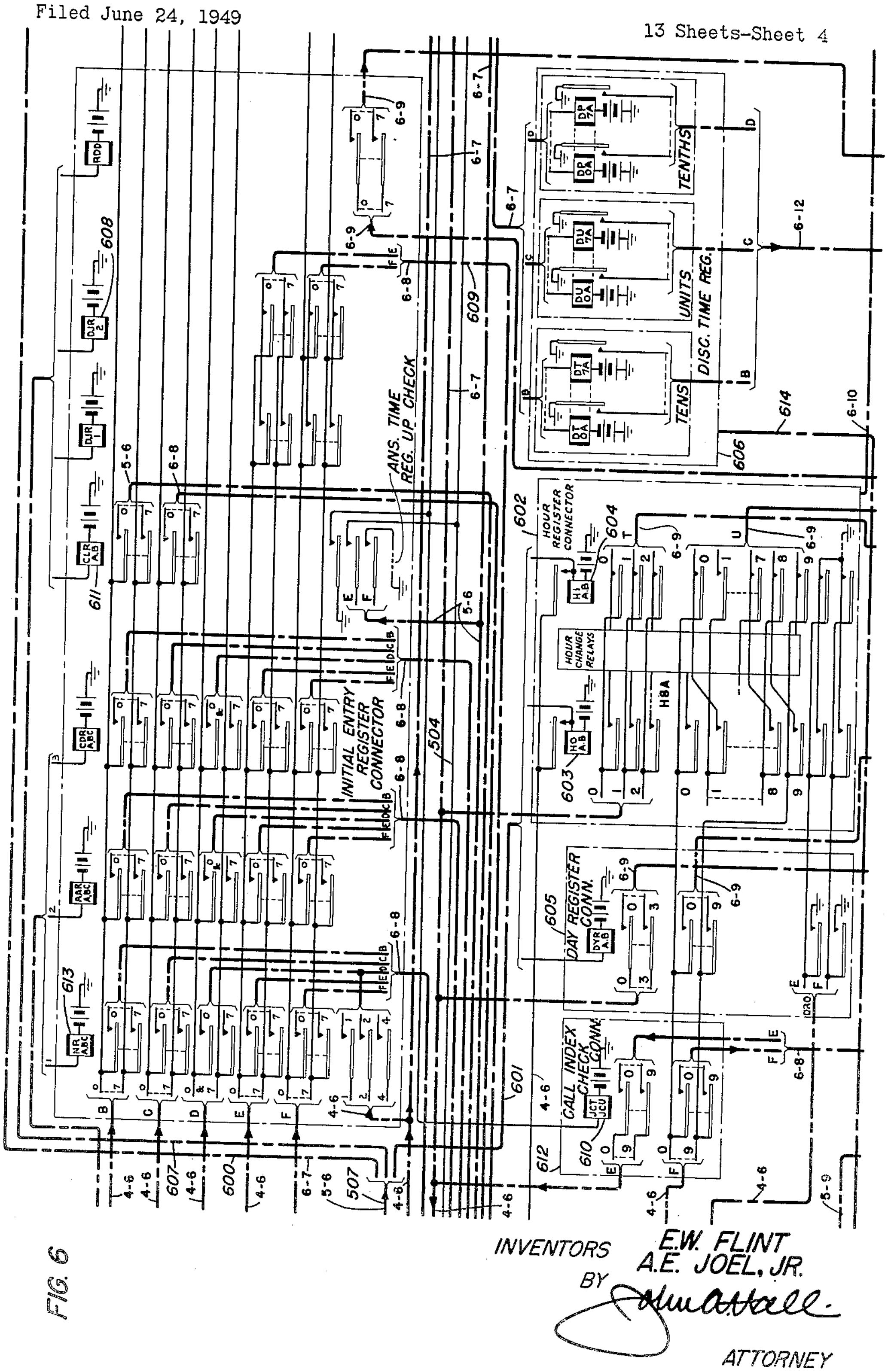
Figure 7:
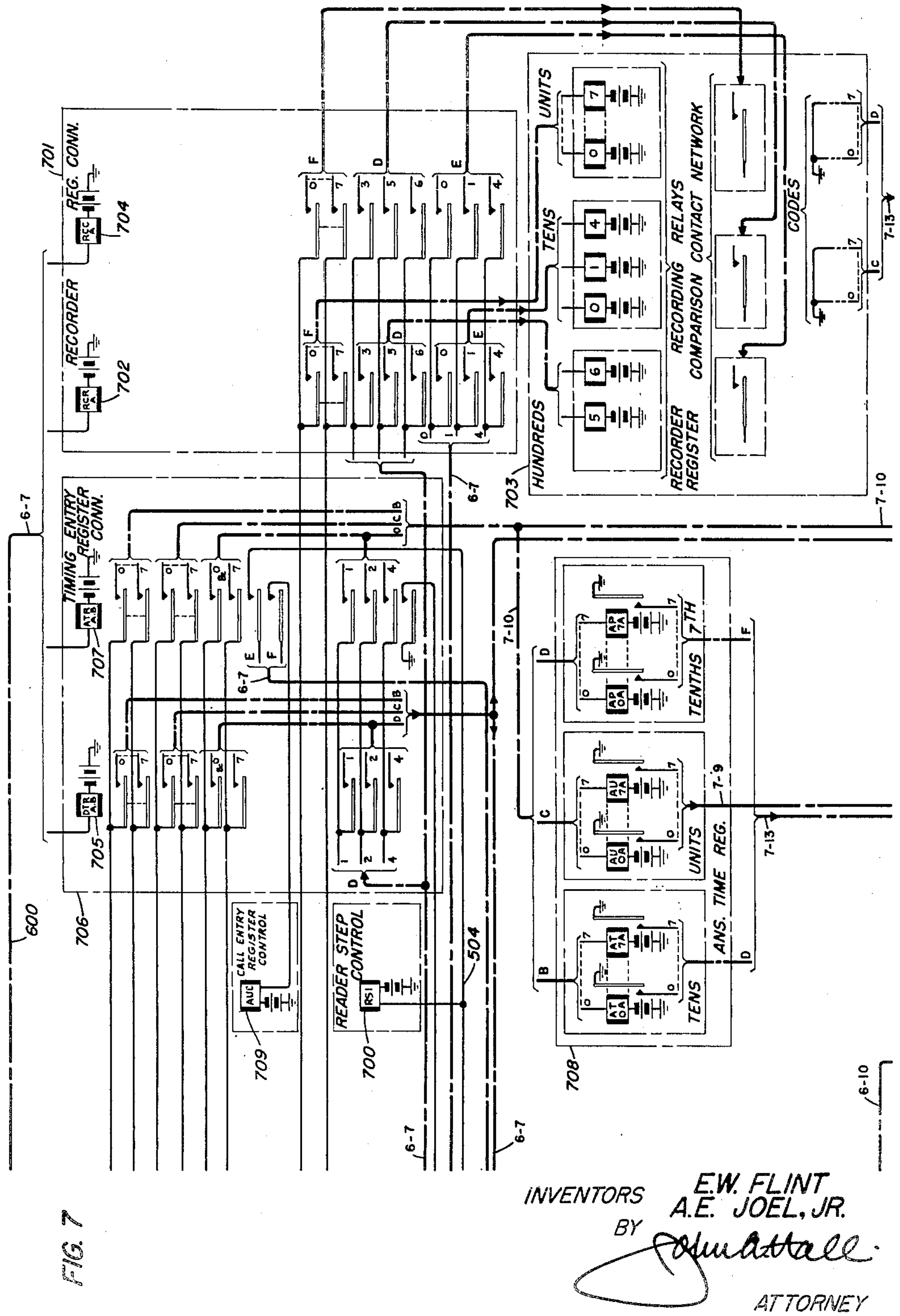
Figure 8:
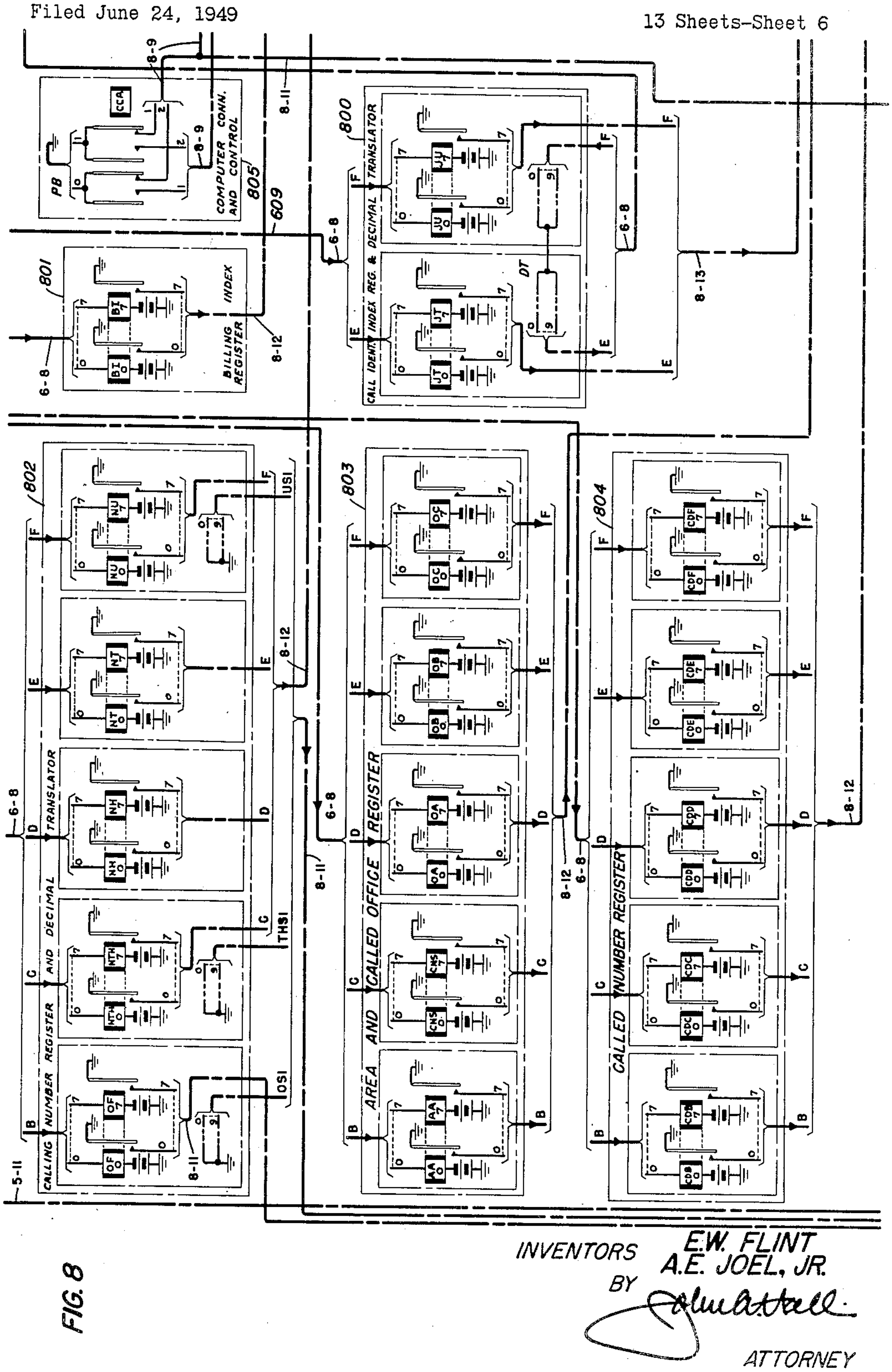
Figure 9:
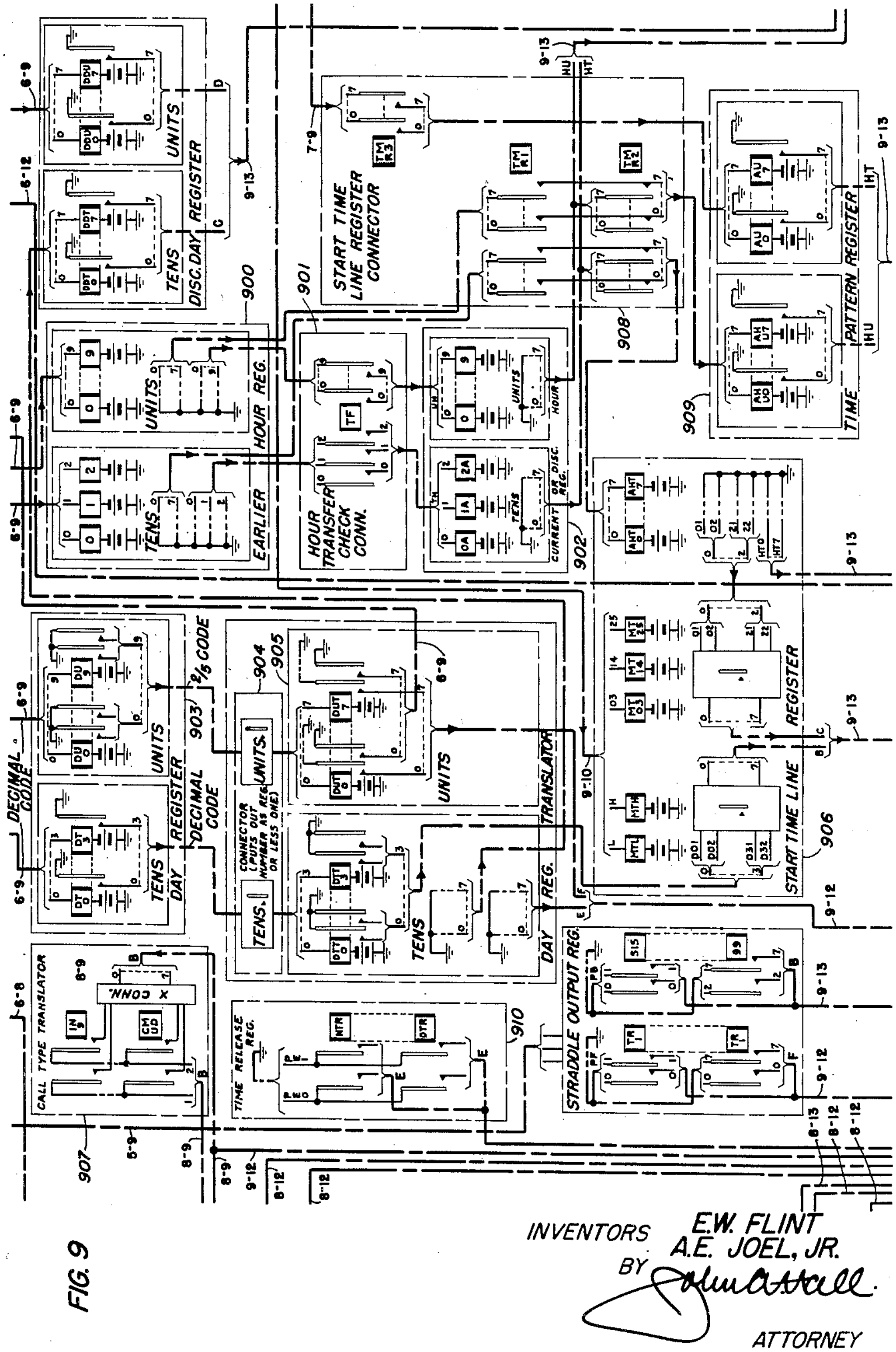
Figure 10:
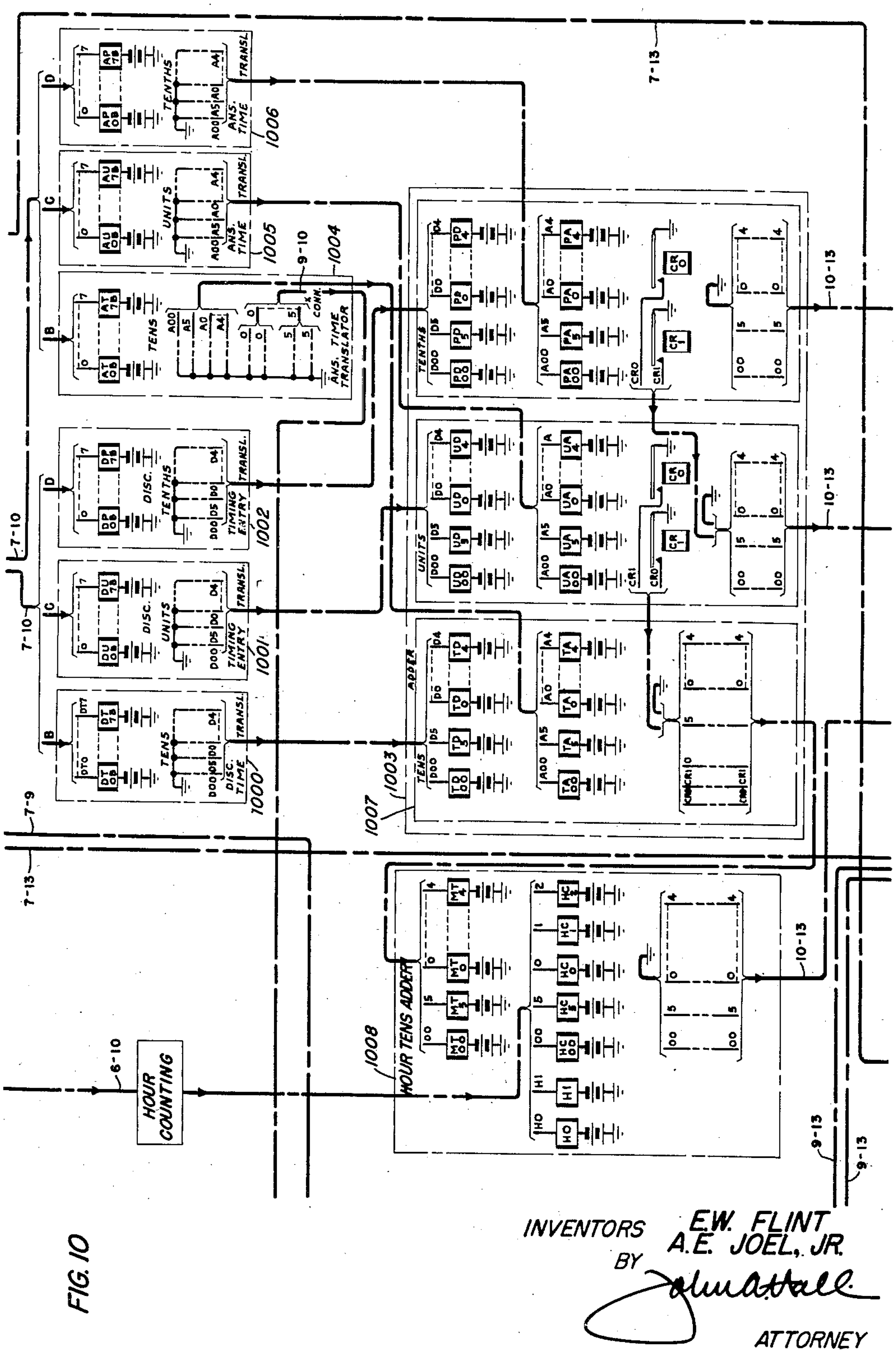
Figure 11:
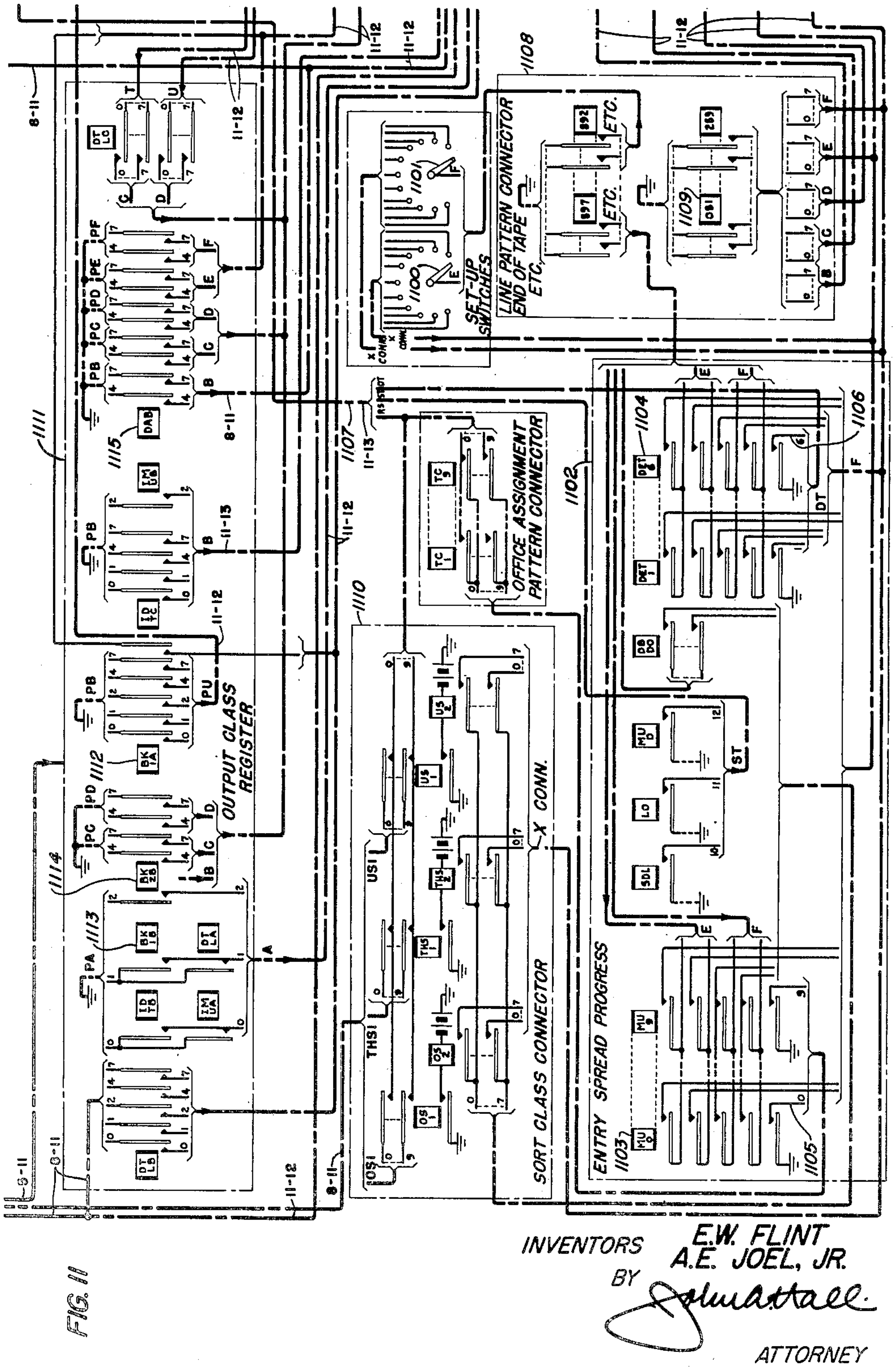
Figure 12:
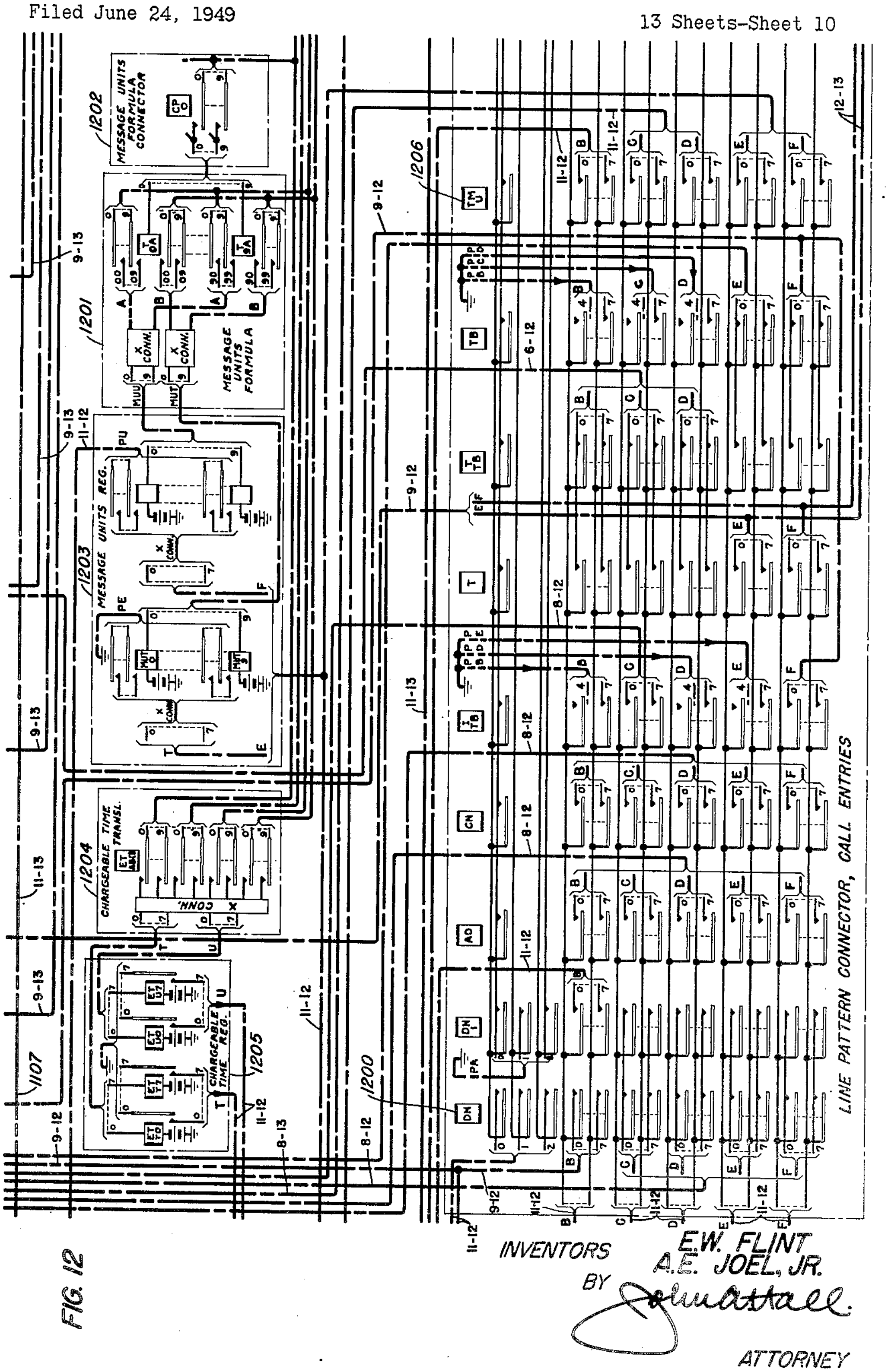
Figure 13:
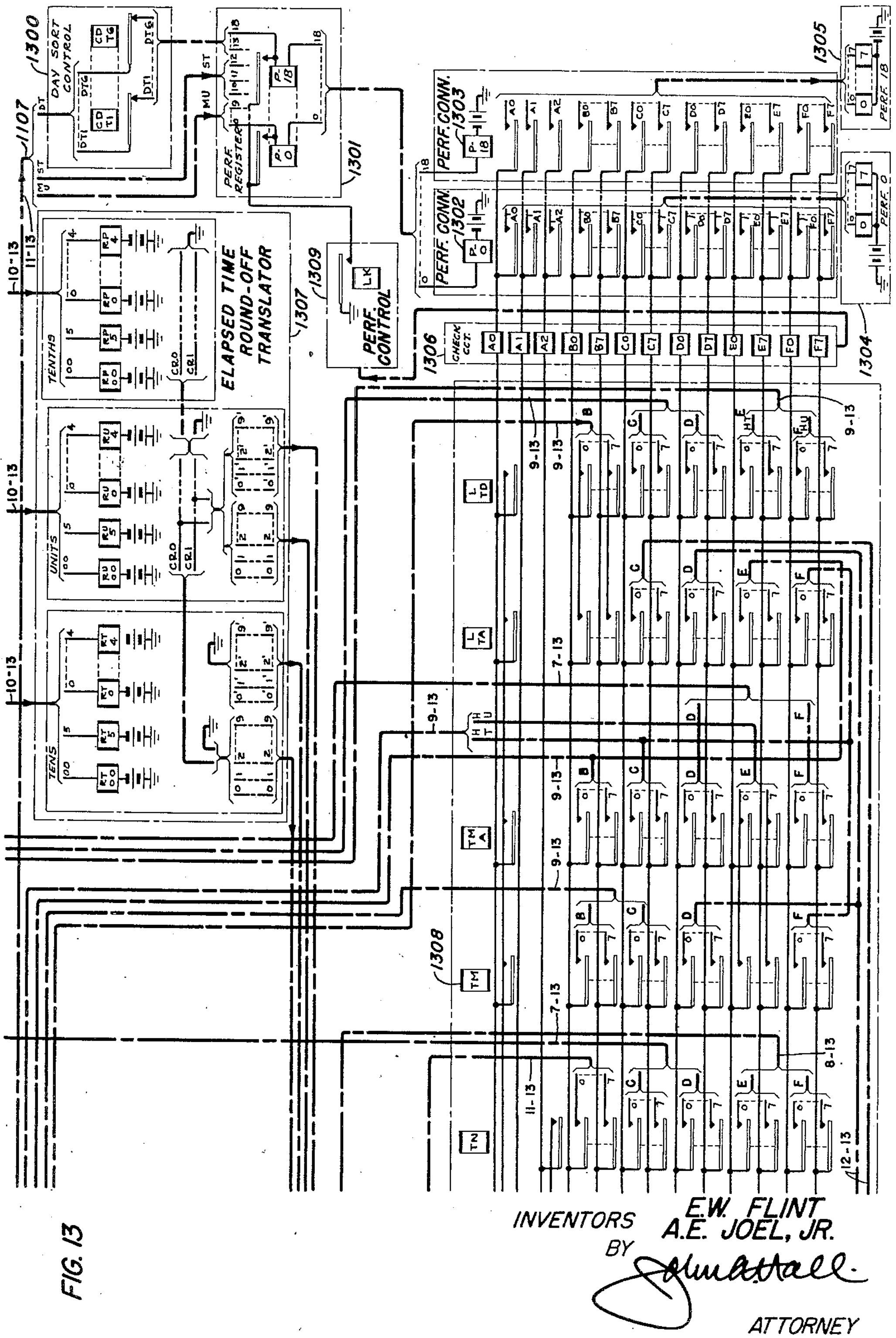
Figure 15:
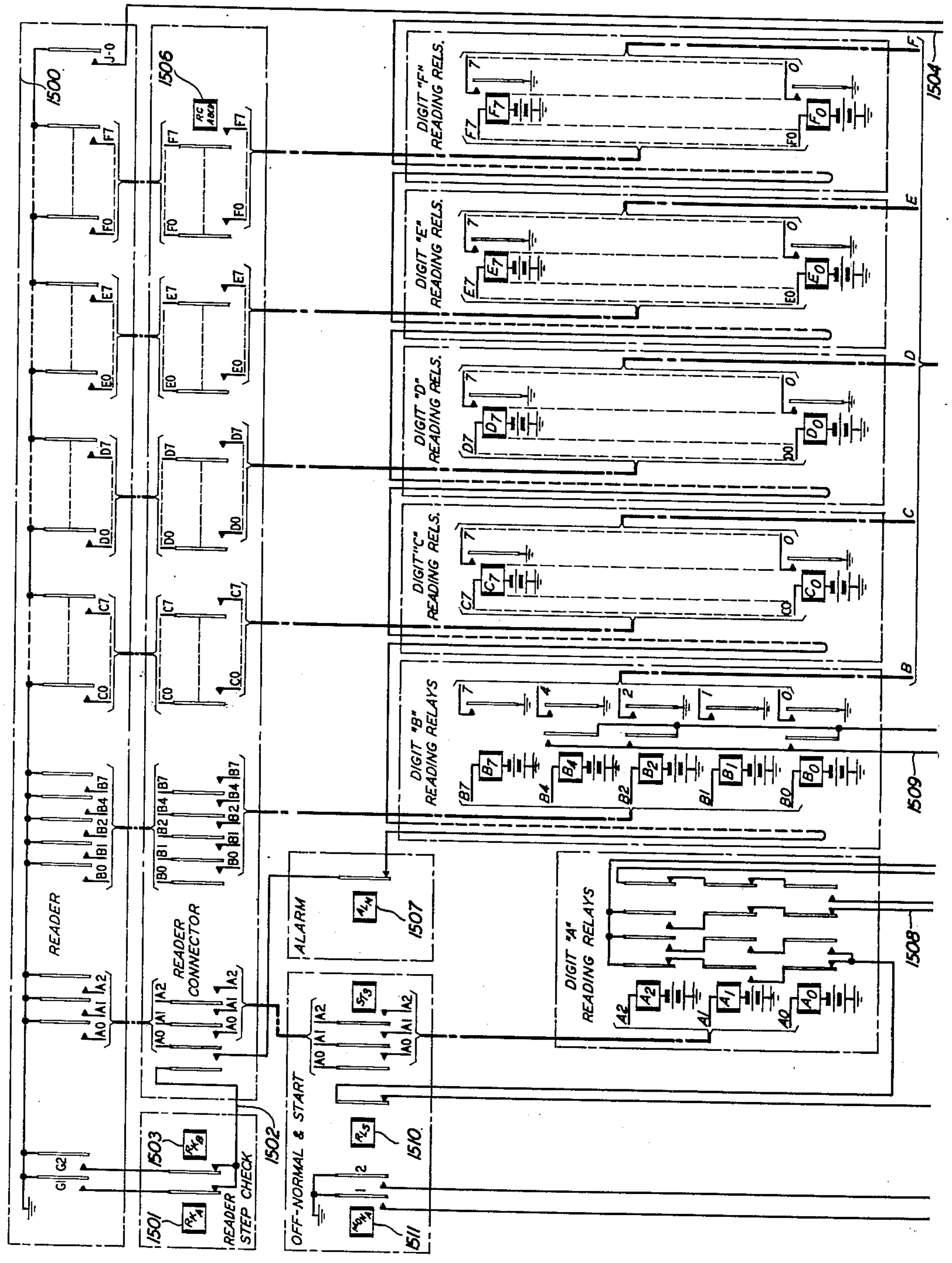
Figure 14:
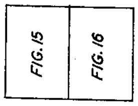
Figure 16:
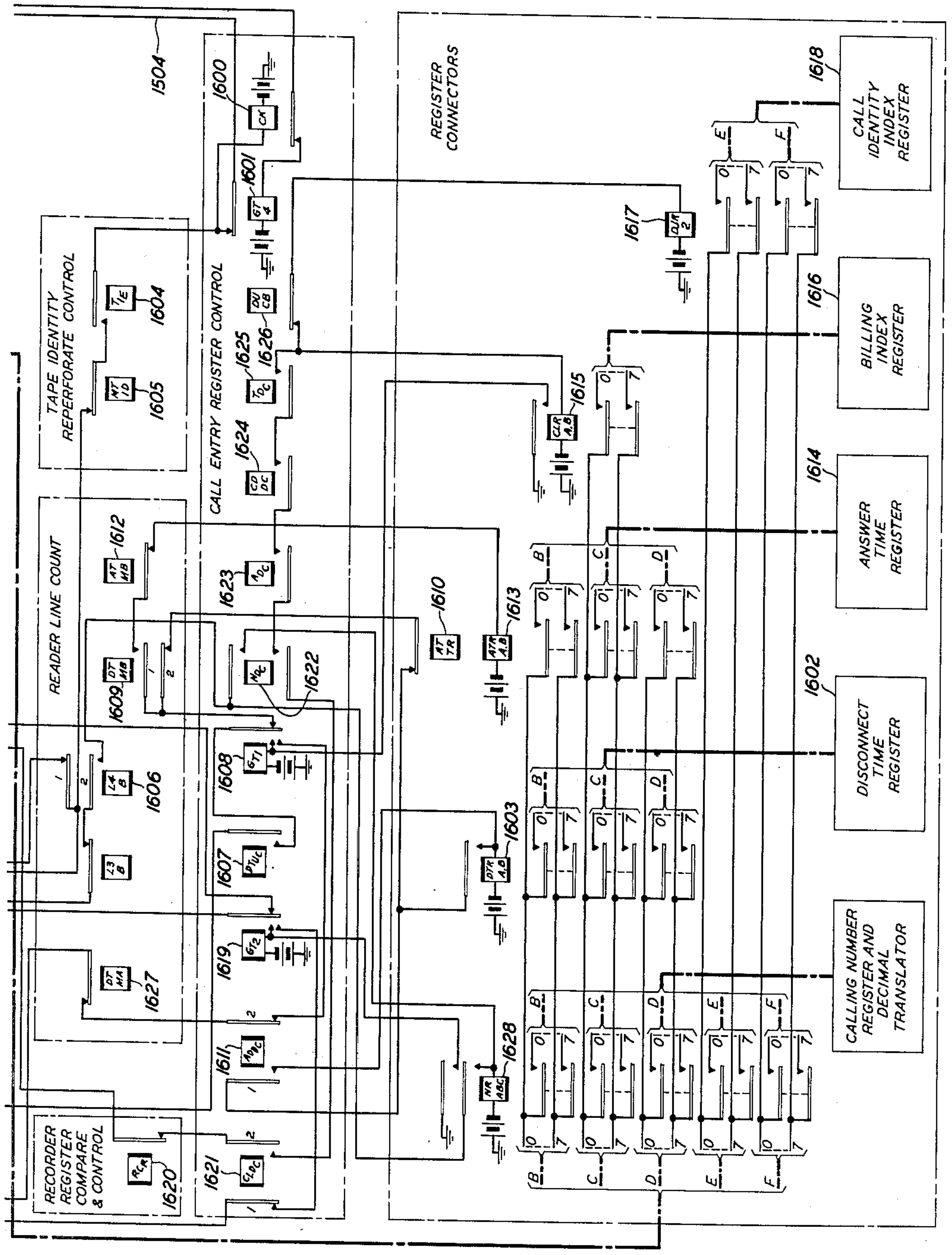

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder that part of the computer which performs the mathematical functions thereof;

Fig. 11 shows the output class register, the sort class connector, the entry spread progress circuit, the office assignment pattern connector, the set-up switches and the line pattern connector for the end of tape perforation;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a block diagram showing how Figs. 15 and 16 may be placed to form a complete schematic diagram illustrating the characteristic feature of the present invention;

Fig. 15 shows in schematic form the reader, the reader connector and the reading relays; and Fig. 16 shows in schematic form the various connector relays for extending connections between the reading relays and the various registers into which information is to be disposed together with the control relays forming the gate means of the present invention.

In the following description the various relays are designated by both letters and numerals which have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29–118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

The apparatus used in constructing the device of the present invention is mostly standard communication apparatus, details of which may be found in the following references:

The relays are of types shown in Patents 1,156,671, E. B. Craft, Oct. 12, 1915; 1,633,576, C. H. Franks, June 28, 1927; 1,652,489, E. D. Mead, Dec. 13, 1927; 1,652,490, D. D. Miller, Dec. 13, 1927; 1,652,491, D. D. Miller, Dec. 13, 1927; 2,169,551, C. I. Baker, Aug. 15, 1939; 2,178,656, P. W. Swenson, Nov. 7, 1939; 2,323,961, F. A. Zupa, July 13, 1943.

The reader is disclosed in application Serial No. 666,280, May 1, 1946, W. W. Carpenter.

Other apparatus is of conventional design.

This application is one of a group of applications all disclosing features of the same device. The Joel application contains a full and complete description of all the circuit details, as well as a short description of several of the features thereof, while the remaining applications, including the present, of this group each contain short descriptions of several other features of the device and each relies upon the said Joel application for the full and complete description of the circuit details of the device as a whole. The complete disclosure of the device of the present invention will, therefore, be found in the present and the following applications:

| Serial No. | Filing Date | Inventor |
|---|---|---|
| 101,087 | June 24, 1949 | A. E. Joel, Jr. |
| 101,088 | June 24, 1949 | Joel-Rippere. |
| 101,084 | June 24, 1949 | Flint-Hague-Joel-Rippere. |
| 101,989 | June 24, 1949 | A. E. Hague. |
| 101,083 [1] | June 24, 1949 | E. W. Flint. |
| 101,086 | June 24, 1949 | R. O. Rippere. |
| 101,082 [2] | June 24, 1949 | Eppel-Joel. |
| 101,090 | June 24, 1949 | Hague-Joel. |

[1] Patent No. 2,546,835, granted March 27, 1951.
[2] Patent No. 2,531,622, granted November 28, 1950.

Other applications covering parts of the same development having disclosures overlapping the present disclosure in certain respects but covering independent inventions, as claimed therein, are as follows:

| Serial No. | Filing Date | Inventor |
|---|---|---|
| 101,081 [1] | June 24, 1949 | S. L. Eppel. |
| 38,927 [2] | July 15, 1948 | J. W. Gooderham. |
| 788,449 | Nov. 28, 1947 | W. W. Carpenter. |

[1] Patent No. 2,522,946, granted September 19, 1950.
[2] Patent No. 2,496,150, granted January 31, 1950.

Other applications having some relation to the present disclosure in that such applications show details of the complete development of which the present is but a part are as follows:

| Serial No. | Filing Date | Inventor |
|---|---|---|
| 724,992 [1] | Jan. 29, 1947 | Carpenter-Gooderham. |
| 759,402 | July 7, 1947 | Carpenter-Collis. |
| 793,298 [2] | Dec. 22, 1947 | Joel-King. |

[1] Patent No. 2,558,476, granted June 26, 1951.
[2] Now abandoned.

It may be noted that the Joel-King application above discloses the over-all plan of the automatic accounting system of which the present application is a part.

*General appearance*

Figure 1:
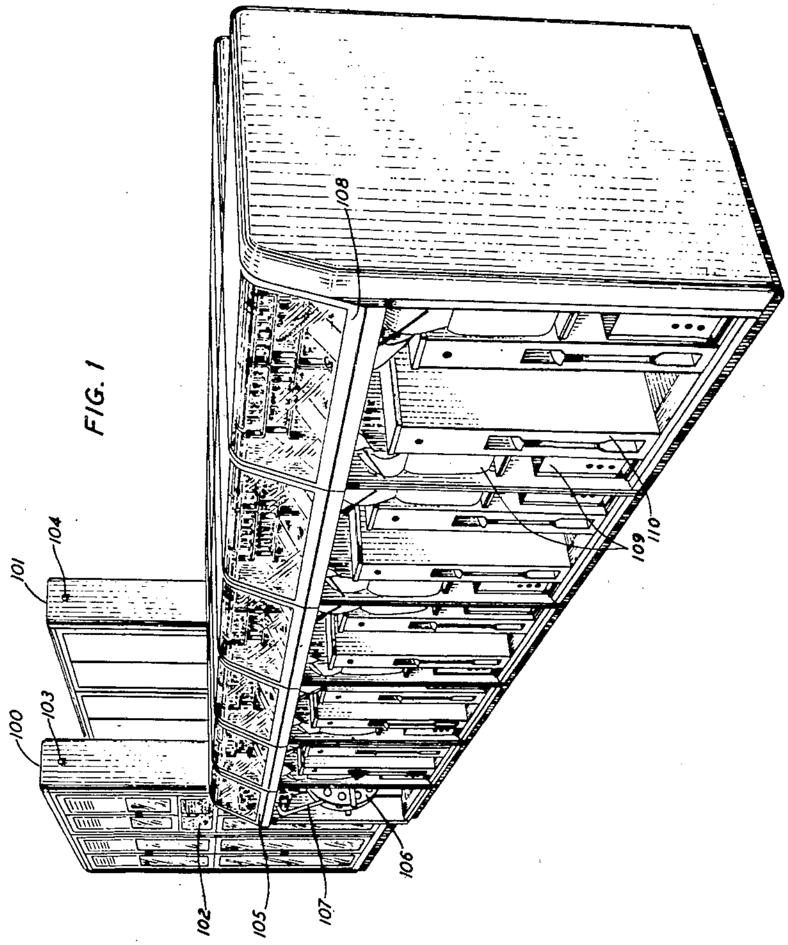
Fig. 1 is a perspective view of the racks and cabinets in which the device of the present invention is housed and is intended to give a general view of the device.

The general appearance of one embodiment of the invention is given in the perspective view in Fig. 1. There are two cabinets 100 and 101 in which the relays and other small apparatus are mounted. The key and lamp panel are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

*General operation*

Figures 2, 3, 4:
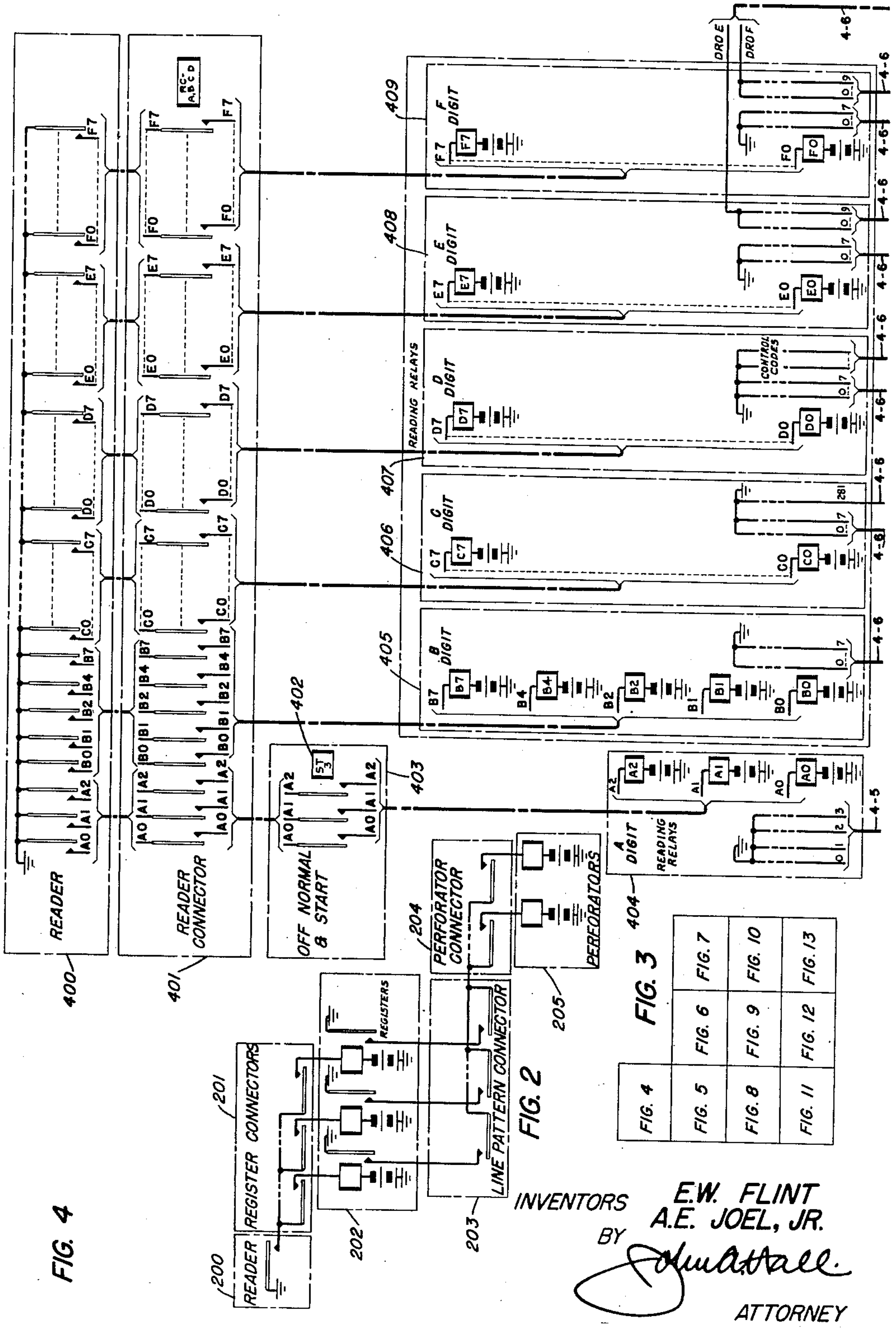

Fig. 2 is what might be termed a thumb nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal re-arrangement and is reregistered and part of which is retained in its original form before being routed to output tapes. At any rate a selecting means, here shown as the line pattern connector 203 is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means is shown in Fig. 4. This consists of a reader 400, a device essentially for the sensing of the twenty-eight code perforations in the automatic accounting system tape, incoming to this unit of the system and which had been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are allotted three for the first or A digit and five for each of the following five B, C, D, E and F digits. The A digit reading relays 404 consist of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit, is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five digit groups of reading relays such as the B digit group 405 have five relays designated 0, 1, 2, 4 and 7 and are known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true information purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established:

1. Sort of MU calls to be effected
2. Marker group—tens
3. Marker group—units
4. First recorder—tens
5. First recorder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrangement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorded on the set-up switches. These various perforators, or rather means to sequentially render them operative to perforate a given code are here represented by the relays such as the MU0 relay 1103 at the left to the DET6 relay 1104 at the left.

The control of this entry spread progress circuit over the perforators is here shown schematically by the conductors such as the 0 conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P-0 relay 1302 and the P-18 relay 1303. Thus, the perforators such as the PERF.0 designated 1304 and the PERF.18 designated 1305, may be sequentially connected to the trunk for controlling the perforations to be made.

This trunk consisting of twenty-eight conductors extends from the line pattern connector 1108, through Fig. 12 and Fig. 13 to the twenty-eight relays A0 to F7 here shown as the perforator check circuit 1306.

The 081010 splice pattern code is formed in the line pattern connector 1108 employed for the end of tape preparation. In this rectangle, there is indicated the 081 relay 1109 which will extend grounds to the conductors of the perforator code trunk described so that each perforator as it is sequentially connected to this trunk will, as before stated perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These are nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately but held until this information can be spread on the output tapes. When the full nine lines of the tape identity codes have been checked, then the IC tape identification check relay is operated, and this will start the next operation by which the tape identification is spread on the prepared ends of each output tape, the complete nine lines on one tape and corresponding lines then repeated on the next tape under control of the entry spread progress circuit 1102. The TIE, tape identification ended relay 505 operates after all the tape identification codes have been perforated in all tapes.

The specific information for each line of tape identification is derived from the setting of the set-up switches such as 1100 and 1101 under control of the line pattern connector 1108 for the end of tape, such information being transmitted over the output trunk to the perforators such as 1304 and 1305.

The output tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 507 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506, over the path 601 cause the operation of the hour register connector 602 to register in the earlier hour register 900 this hour entry (generally 03). If this is as now assumed the first hour entry, then the H1A—B relay 604 is operated to register the hour as read. It may be noted that each subsequent hour entry, 2810TU is through the H0A—B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances, there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the date by 1 but may entail a complete change, such as from 1 to 31, 30, 29 or 28.

The recorder hour and day entries are not copied on any one of the output tapes but the registrations are held available to the line pattern connector whereby bits of information are gleaned from different sources to form the required output lines.

The computer acts as a sorting device to sort the various charges into different categories, such as message unit charges, toll charges, detailed records, line observing records and irregular records as well as discards. In addition, in single office marker groups the message unit calls may be further sorted by one digit of their directory numbers. Tapes from multioffice marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6–5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6.

Let it be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA—B relay 705 in the timing entry register connector 706 so that the B, C and D digits thereof may be transmitted through the B, C, and D sections of the disconnect time translator designated 1000, 1001 and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regular output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identity index and must be registered to identify later entries of this same call. Accordingly, when this line is read by the reader the control circuits 506, over the path 607, cause the operation of the DJR2 relay 608 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 up-check circuit and the call identity index register 800 up-check circuits are closed showing a proper registration of this entry, the RS1 reader step relay 700 (circuits not indicated) is operated and the reader is advanced to read the next entry, the answer time.

The answer time line

153527 is now read by the reader. The control circuits 506, over path 600 now cause the operation of the ATRA—B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend as its nine's complement, to add in a one in the lowest denominational order and to ignore, or throw away the carry one out of the highest denominational order. Thus, where the disconnect time is 58.2 and the answer time is 53.5 the elapsed time is 4.7 and this is arrived at by adding $$\begin{array}{r} 582 \\ 464 \\ 1 \\ \hline 1047 \end{array}$$

wherein the left-hand 1 is discarded so that the result becomes 047

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for purposes to be described. The carry-out 0 will indicate a negative result while the carry-out 1 will indicate a normal positive result and will constitute a signal to advance the operations.

As in the case of the disconnect time, the answer time also is registered in the answer time register 708. When the answer time up-check circuit is closed the AUC relay 709 is operated providing the call identity index also checks and the RS1 reader step relay is also operated to advance the reader to the first line of the initial entry.

Upon the operation of the ATRA—B answer time register connector relay 707 a ground is extended directly to the JCT—JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the later operation of the output class register 1111. In this case the control circuits 506 over the path 607 operate the CLRA—B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA—B—C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elapsed time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1–A relay 1112 in the output class register 1111 to the B group of contacts of the DN relay 1200 so that the B digit of the output line will contain the computed charge in message units.

The calling line number is transmitted from the C, D, E and F parts of the calling number register 802 to the C, D, E and F contacts of the DN relay 1200 so that these digits of the output line will contain this calling line number.

The A digit of the output line is formed through the operation of one of the relays in the output class register 1111, such as the BK1–B relay 1113 so that this is recorded as 1.

Had the number of message units calculated been ten or over and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2–B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2–B relay 1114. The computer connector and control circuit 805 may be set to operate through the call type translator 907 to change the record in the B digit through the TMU relay 1206 from a 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All calls or groups of items of information representing the data for each customer charge consists of three items, a disconnect time, an answer time and an initial entry. In each case the two timing entries are entered first so that they be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 904 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TM pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows. The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a constant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

*The characteristic feature of the invention*

The feature with which the present invention is particularly concerned is one included in the computer circuit which is fully disclosed in the above noted Joel application and it consists generally of what is herein termed a gate means for controlling communication between the reading relays and the various registers into which information read by the reader and transmitted to the reading relays is forwarded. Since the reader is operated by a constant speed motor and since the time intervals are very small, the operations must be precise and hence means is provided whereby the maximum interval for an operation is insured. The present invention is concerned with the gate relays which obstruct the communication paths between the reading relays and the registers for the purpose of insuring that when the gate is open it shall definitely be open at the beginning of a reading cycle and, therefore, cannot be cut short by any delay. The essential consideration is that the gate relays are operated and locked during operations which might interfere with the proper transmission of intelligence from the gate relays to the registers and are only opened when all conditions for the transmission are satisfactory. Each of these gate relays will, therefore, have a branch of its locking circuit under control of the means which would operate the connector relays so that if the conditions for allowing the transmission from the reader relays to the registers should occur within a reading cycle, then the gates would not be opened for only the remaining part of the cycle. Therefore, the gate relays are locked by the means which would operate the connector relays and are, therefore, held locked until the end of the reading cycle so that it is certain that the gates when opened will be opened between the reading intervals and, therefore, afford this operation its maximum interval.

It is hereinbefore set forth that the reading interval is one of about 40 milliseconds followed by an open interval of half this length. Each of the contacts shown in the reader 1500 will, therefore, be closed for 40 milliseconds and opened for 20 milliseconds. The G1 and G2 contacts operate in alternate reading intervals for a special purpose with which we are not at present concerned. Therefore, a ground will be forwarded by either the G1 contact through the back contact of the RKA relay 1501 to the conductor 1502 or alternatively through the G2 contact through the front contact of the RKB relay 1503 to the conductor 1502. Under normal operation, therefore, a precisely timed train of pulses exactly corresponding in time and in length to the pulses over the principal reader contacts A0 to F7, inclusive, will be transmitted over the conductor 1502.

There is at the extreme right of the reader a contact marked J0. This contact is known as a late make contact and although it closes and opens for the same length intervals, its operation is slightly offset and is later in time than the pulses, for instance, over the conductor 1502. This contact closes a circuit through the back contact of the CK relay 1600 to operate the GT4 relay 1601 and if the CK relay did not operate then the GT4 relay would repeatedly operate through operated periods of 40 milliseconds and released periods of 20 milliseconds, each delayed very slightly (about 9 milliseconds) behind the reading intervals. It may be explained here that this provision is made so that when a ground on conductor 1504 appears at the beginning of a reading interval then the CK relay 1600 will operate to prevent the operation of the GT4 relay 1601. If, however, there is some delay amounting to as much as 9 milliseconds in the application of ground to the conductor 1504, then the GT4 relay 1601 will operate first and prevent the operation of the CK relay 1600 and the forwarding of the ground impulse to other destinations. This constitutes a gate means which is closely associated with the gate means of the present invention but is not included within the present invention.

It may be explained that the fundamental circuit for operations in this device is afforded by the ground transmitted by either the G1 or the G2 contact over the paths explained to conductor 1502, thence through an armature and contact of the RCA—B—C relay 1506 constituting the reader connector through the armature and back contact of the ALM alarm relay 1507 and thence in a validity circuit comprising contacts of the reader relays for the B, C, D, E and F digits indicated by the broken lines in each of the digital positions to the conductor 1504 whence it is extended by the armature and back contact of the GT4 relay to the winding of the CK relay 1600 and to other points which will be explained shortly. The validity circuit consists of a contact configuration whereby it is certain that two out of the five relays in each digital position are operated so that if the ground on conductor 1502 is extended to the conductor 1504, it is certain that the reading relays have operated in a valid combination.

Under normal operation of the computer the first code read by the reader in any group of items of coded information is one known as a timing code and this is generally a code disclosing the disconnect time of a call. This disconnect time must then be registered in the disconnect time register here indicated by the rectangle 1602. In order to enable the disconnect time register, the disconnect time register connector relay 1603 must be operated in order to effect communication between the reading relays and the register. Therefore, when the disconnect time line code is transmitted the ground appearing on conductor 1504 checking the fact that the disconnect time code has been read and registered on the reading relays and that a legitimate combination of the reading relays has been operated, thence over the back contact and armature of the GT4 relay 1601, the armature and contact of the TIE tape identification ended relay 1604 operated at this time, the armature and the back contact of the MTID mutilated tape identity relay 1605, the armature 1 and back contact of the L4B reader line count relay 1606, thence over a circuit proving that the A digit of this timing entry is a 1 and, therefore, including back contacts of the A2 and A0 relays and the front contact of the A1 relay, the armature and back contact of the RLS motor release relay 1510, the armature and front contact of the DTUC day translator up-check relay 1607, the armature and back contact of the GT1 gate relay 1608, the armature 2 and back contact of the DTMB (the reader for counting the disconnect time line) relay 1609, the armature and back contact of the ATTR answer time translator connector relay 1610, the armature 1 and front contact of the ADDC answer and disconnect register's down-check relay 1611 to the winding of the DTRA—B relay 1603. Thus, if all the conditions posed by the relays above mentioned have been properly met, the disconnect time register connector 1603 will operate so as to extend the contacts controlled by the reading relays to the disconnect time register 1602 and thus cause the registration therein of this time line. All of this happens within one reading interval.

As soon as the disconnect time has been thus registered in the disconnect time register the DTMB relay for counting the disconnect time line will be operated in accordance with the full explanation set forth in the said Joel application. Also the ADDC relay will be released since now the disconnect time register has been occupied and, therefore, the down-check circuit has been opened. Therefore, on the next reading interval the circuit heretofore traced as far as the armature and back contact of the GT1 relay will now be extended over the armature 1 and front contact of the DTMB relay 1609, through the armature and back contact of the ATMB answer time line counting relay 1612 and thence to the winding of the ATRA—B relay 1613 which is known as the answer time register connector relay and which will effect communication between the contacts of the reading relays and the answer time register so that this second timing line entry may be registered in the answer time register 1614.

Under normal conditions the next line read will be the first line of an initial entry. This is a code containing among other things an entry index of 0, 1, 3 or 4 in the B digit, a billing index in the C digit and the call identity index in the E and F digits. Therefore, the CLRA—B relay 1615 must be operated to effect communication between the C digit relays and the billing index register 1616 and the DJR2 relay 1617 must be operated to effect communication between the E and F digit reading relays and the call identity index register 1618.

When this initial line entry is transmitted by the reader to the reading relays, therefore, the conductor 1504 will be grounded as hereinbefore described and this ground will be extended over the armature 1 and back contact of the L4B relay 1606 and thence through a combination of the A digit reading relays set to express the digit 2 which is invariably the digit of the first line of an initial entry so that ground is now extended through a chain circuit comprising a front contact of the A2 reading relay and back contacts of the A1 and A0 reading relays to conductor 1508 and thence over the armature and back contact of the GT2 relay 1619, through an armature and contact of at least one of the B0, B2 or B4 reading relays to conductor 1509, through the armature and back contact of the RCR recorder number register relay 1620, the armature 2 and front contact of the CLDC class register's down-check relay 1621, thence in a chain through the armatures and front contacts of a plurality of call entry register down-check relays including the NDC relay 1622, the ADC relay 1623, the CDDC relay 1624, the TDC relay 1625 to the winding of the CLRA—B relay 1615 and in parallel with the winding of this latter relay, through the back contact and armature of the DUCB disconnect time register up-check relay 1626 to the winding of the DJR2 call identity index register connector relay 1617. Therefore, the two register connector relays for effecting communication between the reading relays and two of the registers receiving parts of the information in the first line of an initial entry are operated.

The CLRA—B relay 1615 will operate the GT1 relay 1608 and this relay will lock to an off-normal ground supplied by the MONA relay 1511, over its armature 2 and front contact, the armature and back contact of the DTMA disconnect time line counting relay 1627, the armature 2 and back contact of the ADDC relay 1611 to the front contact of the GT1 relay 1608. The ADDC relay will, of course, remain normal as long as an answer and a disconnect time remains registered in either of these registers and, therefore, the GT1 relay will remain locked.

Now in accordance with the full and complete description in said Joel application it will appear that the answer and disconect time registers may be released while the initial entry is being registered and, therefore, if the ADDC relay operates to signal the fact that the answer and disconnect registers have fully released the GT1 relay 1608 will release and, therefore, again close the first circuit hereinbefore described extended to the DTRA relay 1603. However, if the ADDC relay 1611 should become released during a reading interval and during which a disconnect time code has operated the reading relays, then the ground on conductor 1504 will be extended over the cricuit hereinbefore described as far as the armature of the GT1 relay 1608 and this ground in itself will now act as a locking means for the GT1 relay so as to hold this relay which would otherwise be released during this reading interval. At the end of the reading interval the GT1 relay will be released and the circuit will then be in complete condition for the operation of the DTRA disconnect time register connector relay 1603 in the manner hereinbefore described with a full reading interval at its disposal.

In the same manner, the GT2 relay 1619 will be operated by the NR calling number register connector relay 1628 which is operated during the transmission of the first supplementary line of an initial entry and the GT2 relay 1619 will then be locked over a circuit from the master off-normal relay 1511 and through the armature and back contact of the CLDC relay 1621. The CLDC relay is known as the class register's down-check relay and this will remain unoperated and in the position shown until all of the registers having to do with items of information set up in an initial entry have been released. Therefore, when a call has been completely disposed of by the computer and the registers which will be effected by the entry of the initial entry for a new call are ready, the CLDC relay will operate and, therefore, unlock the GT2 relay 1619. However, and in the manner hereinbefore described, if this happens during a reading interval in which the reader is reading a first line of an initial entry, then the ground transmitted over conductor 1504 will be transmitted further over conductor 1508 to the armature of the GT2 relay 1619 and hold this relay operated though its other locking circuits have been opened. Thus, again, this gate relay will insure that when the first line of an initial entry is to be entered a full interval will be provided for this purpose.

What is claimed is:

1. An automatic accounting system wherein coded records are processed to produce customer bills in a number of steps from records automatically produced by customer uses of given facilities over variable time periods, said coded records being in the form of tapes each of which contains items of information in the form of lines of perforations representing elements of a code, means for processing said records including a reader for translating the perforations in said tapes into electrical pulses, a set of reading relays responsive to said electrical pulses, registers for registering items of information expressed by said reading relays, a means associated with said reader for producing a train of precisely timed pulses, said reader being constructed and arranged to transmit reading pulses during each of said precisely timed pulses, gate means for controling communication between said reading relays and said registers and locking circuits for said gate means closed by said gate means and responsive to said reading pulses whereby said gate means cannot be opened during a reading pulse interval.

2. A reader for sensing codes in a perforated tape, having a plurality of sensing fingers each provided with an electrical contact means for closing a circuit when its associated finger encounters a perforation in a tape, a constant speed motor for operating said reader for periodically impelling said sensing fingers against a tape for sensing a code perforated therein, a cam arrangement operated by said reader motor for closing an electrical circuit to produce a train of precisely timed pulses, a reading relay for each said sensing finger responsive to the said electrical contact means individual thereto, registers for registering items of information expressed by said reading relays, register connectors for selectively controlling transmission paths between said reading relays and said registers, a gate means common to a plurality of said reading relays for opening the circuits of said register connectors, independent means for operating said gate means and self-controlled locking means for gate means responsive to said individual associated contact means, whereby in the event that said gate means has not been released by said independent operating means prior to the beginning of one of said precisely timed pulses, said gate means will remain locked by one of said individual contact means to prevent the transmission of information from said reading relays to one of said registers at any other time than the beginning thereof as measured by said precisely timed pulses.

3. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, selectively operated register connectors for establishing transmission paths between said reader and said registers, said reader operating in a continuous series of cycles of precisely timed reading intervals and non-reading intervals, gate means including relays for controlling the operation of said register connectors, a locking circuit for each of said gate relays jointly controlled by said register connectors and said reader, whereby the release of each of said gate relays to render a register connector accessible for operation is dependent on (*a*) the complete release of the corresponding register and (b) the completion of a reading interval by said reader.

4. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, selectively operated register connectors for establishing transmission paths between said reader and said registers, said reader operating in a continuous series of cycles of precisely timed reading intervals and non-reading intervals, gate means including relays for controlling the operation of said register connectors, a locking circuit for each of said gate relays jointly controlled by said register connectors and said reader, whereby the release of each of said gate relays to render a register connector accessible for operation is dependent on (*a*) a complete release of the corresponding register and (*b*) the completion of a reading interval by said reader, a plurality of recorders for recording customer charges derived from said registered information, sorting means responsive to said registered information for selecting one of said recorders for each said derived customer charge, and a plurality of pattern forming means for deriving from said registered information the information necessary for each output item of information to be recorded by said selected recorder.

5. In an automatic accounting system in which customer charges for uses of given facilities are derived from scattered items of specific and general information recorded on continuous tapes during and by the said customer uses of the given facilities and wherein the conversion of the data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a set of reading relays responsive to said reader, said reader and said reading relays operating in a continuous series of cycles of precisely timed reading intervals and non-reading intervals, a source of precisely timed pulses each extending over a said reading interval, a validity circuit extending from said source of pulses and through a contact network controlled by said reading relays closed during said reading intervals when and only when said reading relays are operated in valid combinations, register connectors for establishing transmission paths between said reading relays and each of said registers, gate relays for controlling said register connectors, means including said gate relays and said validity circuit for selectively operating said register connectors, down-check means for said registers for establishing and reporting the occupied or completely released condition of said registers, locking circuits for said gate relays jointly controlled by said down-check means and said validity circuit whereby said register connectors may be effectively operated only during a non-reading interval of said reader.

ERLON W. FLINT.
AMOS E. JOEL, Jr.

REFERENCES CITED

The following references are of record in the file of this patent:

UNITED STATES PATENTS

| Number | Name | Date |
|---|---|---|
| 2,375,293 | Doty | May 8, 1945 |